(12) United States Patent
Takashima et al.

(10) Patent No.: US 11,085,101 B2
(45) Date of Patent: Aug. 10, 2021

(54) HOT-PRESSED MEMBER AND METHOD FOR MANUFACTURING SAME, AND COLD-ROLLED STEEL SHEET FOR HOT PRESSING AND METHOD FOR MANUFACTURING SAME

(71) Applicant: JFE STEEL CORPORATION, Tokyo (JP)

(72) Inventors: Katsutoshi Takashima, Tokyo (JP); Takashi Kobayashi, Tokyo (JP); Yoshimasa Funakawa, Tokyo (JP); Seiji Nakajima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 16/618,887

(22) PCT Filed: Mar. 30, 2018

(86) PCT No.: PCT/JP2018/013728
§ 371 (c)(1),
(2) Date: Dec. 3, 2019

(87) PCT Pub. No.: WO2019/003543
PCT Pub. Date: Jan. 3, 2019

(65) Prior Publication Data
US 2020/0131596 A1   Apr. 30, 2020

(30) Foreign Application Priority Data

Jun. 30, 2017 (WO) ................. PCT/JP2017/024261

(51) Int. Cl.
| | | |
|---|---|---|
| B32B 15/01 | (2006.01) | |
| C21D 9/46 | (2006.01) | |
| B21D 22/02 | (2006.01) | |
| C21D 1/18 | (2006.01) | |
| C21D 6/00 | (2006.01) | |
| C21D 8/02 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/08 | (2006.01) | |
| C22C 38/16 | (2006.01) | |
| C22C 38/26 | (2006.01) | |
| C22C 38/28 | (2006.01) | |
| C22C 38/32 | (2006.01) | |
| C23C 2/06 | (2006.01) | |

(Continued)

(52) U.S. Cl.
CPC ............ *C21D 9/46* (2013.01); *B21D 22/022* (2013.01); *B32B 15/012* (2013.01); *B32B 15/013* (2013.01); *C21D 1/18* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/16* (2013.01); *C22C 38/26* (2013.01); *C22C 38/28* (2013.01); *C22C 38/32* (2013.01); *C23C 2/06* (2013.01); *C23C 2/12* (2013.01); *C23C 2/40* (2013.01); *C21D 2211/004* (2013.01); *C21D 2211/008* (2013.01); *Y10T 428/12799* (2015.01); *Y10T 428/12958* (2015.01)

(58) Field of Classification Search
None
See application file for complete search history.

(56) References Cited

U.S. PATENT DOCUMENTS

| | | | | |
|---|---|---|---|---|
| 9,353,424 B2 * | 5/2016 | Tanahashi | ................ | C21D 6/02 |
| 2017/0029913 A1 | 2/2017 | Bae et al. | | |

FOREIGN PATENT DOCUMENTS

| | | |
|---|---|---|
| EP | 2975150 A1 | 1/2016 |
| EP | 3124637 A1 | 2/2017 |
| JP | 2010174282 A | 8/2010 |

(Continued)

OTHER PUBLICATIONS

Feb. 26, 2020, the Extended European Search Report issued by the European Patent Office in the corresponding European Patent Application No. 18824186.3.

(Continued)

*Primary Examiner* — Daniel J. Schleis
(74) *Attorney, Agent, or Firm* — Kenja IP Law PC

(57) ABSTRACT

Disclosed is a hot-pressed member that can exhibit very high tensile strength after hot pressing as high as TS: 1780 MPa or more and excellent delayed fracture resistance after projection welding by properly adjusting its chemical composition and its microstructure such that at least 5 Ti-based precipitates having a grain size of 0.10 μm or less are present on average per 100 μm² of a cross section parallel to a thickness direction of the member within a range of 100 μm in a thickness direction from a surface of the member, a volume fraction of martensite is 95% to 100% within a depth range of 20 μm to 100 μm in the thickness direction from the surface of the member, and at least 10 cementite grains having a grain size of less than 0.20 μm are present on average in a prior austenite grain.

16 Claims, No Drawings

(51) Int. Cl.
*C23C 2/12* (2006.01)
*C23C 2/40* (2006.01)

(56) References Cited

FOREIGN PATENT DOCUMENTS

| | | |
|---|---|---|
| JP | 2012157900 A | 8/2012 |
| JP | 2012179646 A | 9/2012 |
| JP | 2013122076 A | 6/2013 |
| JP | 2013147749 A | 8/2013 |
| JP | 2014015638 A | 1/2014 |
| JP | 2014040628 A | 3/2014 |

OTHER PUBLICATIONS

Jul. 3, 2018, International Search Report issued in the International Patent Application No. PCT/JP2018/013728.

* cited by examiner

HOT-PRESSED MEMBER AND METHOD FOR MANUFACTURING SAME, AND COLD-ROLLED STEEL SHEET FOR HOT PRESSING AND METHOD FOR MANUFACTURING SAME

BACKGROUND

The present disclosure relates to a hot-pressed member and a method for manufacturing the same, and a cold-rolled steel sheet for hot pressing and a method for manufacturing the same, and particularly to the improvement of delayed fracture resistance after projection welding of a hot-pressed member. As used herein, the term "hot-pressed member" refers to a member obtained by hot press forming a cold-rolled steel sheet having quench hardenability to increase its strength.

In addition, examples of the cold-rolled steel sheet disclosed herein include not only general cold-rolled steel sheets, but also hot-dip galvanized cold-rolled steel sheets (including galvannealed cold-rolled steel sheets), electrogalvanized cold-rolled steel sheets (including zinc-nickel alloy-electroplated cold-rolled steel sheets), and aluminum-coated or aluminum-plated cold-rolled steel sheets.

BACKGROUND

In recent years, $CO_2$ emission regulations have become more stringent due to rising environmental problems, and in the automobile field, weight reduction of vehicle bodies has become an issue for reduced fuel consumption. To this end, sheet metal thinning by application of high-strength steel sheets to automobile parts is advanced, and application of steel sheets with tensile strength (TS) of 1780 MPa or more is considered.

High-strength steel sheets used for structural members and reinforcing members of automobiles are required to have excellent formability. However, in a steel sheet with TS of 1780 MPa or more, cracking would occur during cold press forming due to low ductility and large spring back would occur due to high yield strength. Therefore, after cold press forming, high dimension accuracy can not be obtained. In addition, since residual stress remains in the steel sheet after cold press forming, delayed fracture (hydrogen embrittlement) may be caused by hydrogen intruding from the use environment.

Under such circumstances, as a method for obtaining high strength, recently, press forming by hot pressing (also referred to as hot stamping, die quenching, press quenching, and so on) has been focused. Hot pressing is a forming method that enables forming with high dimensional accuracy by heating a steel sheet to the temperature range of austenite single phase and then forming (processing) the steel sheet at the high temperature, and that enables increase of the strength through quenching by cooling the steel sheet after the forming. Moreover, in this hot pressing, since the residual stress after press forming is reduced as compared with cold pressing, the delayed fracture resistance is also improved.

However, although many automobile assembly processes are accomplished by resistance spot welding, in part, assembly is achieved by bolting where a gun of a resistance spot welding machine can not enter. In addition, bolting is often used in the case of joining steel sheets with dissimilar materials (such as aluminum, resin, and the like). In this case, a nut having projection parts is resistance-welded to a steel sheet, which in turn is assembled with another steel sheet using a bolt.

As described above, although the residual stress is reduced in the hot-pressed member, stress is also applied after the hot pressing in order to maintain the rigidity of the entire automobile body. As such, delayed fracture may occur in a weld between the nut and the steel sheet.

CITATION LIST

Patent Literature

PTL 1: JP2012-157900A

SUMMARY

Technical Problem

Conventionally, as means for improving the peeling strength of a nut after projection welding, techniques for improving the peeling strength by controlling welding conditions have been proposed, as described in, for example, JP2012-157900A (PTL 1). However, none of the conventional techniques were able to improve the delayed fracture resistance in projection welds of nuts after hot pressing.

As described above, it is considered difficult to improve, regardless of welding conditions, the delayed fracture resistance of a hot-pressed member with TS of 1780 MPa or more at a projection weld with a nut, and a hot-pressed member showing improvement in these properties has not been developed.

Solution to Problem

Therefore, as a result of intensive investigations in view of the above situation, the present inventors discovered that in order to improve the delayed fracture resistance of a hot-pressed member after projection welding with a nut, it is effective to have Ti-based precipitates as hydrogen trapping sites and at the same time improve the toughness after projection welding, and to have fine cementite as hydrogen trapping sites in the prior austenite grains of the surface layer of the member.

It was revealed that with this configuration, even when hydrogen enters due to corrosion, such hydrogen can be effectively trapped, which may suppress crack formation at the interface between the nut and the steel sheet, resulting in improved delayed fracture resistance.

In a finished automobile body, hydrogen is generated electrochemically on a member steel sheet due to rain or the like while traveling is actually repeated, and some of the hydrogen penetrates into the member steel sheet. If no stress is generated in the member steel sheet, delayed fracture does not occur due to such hydrogen. However, the weld with the nut may be stressed after the bolt is tightened. As a result, a crack is generated originating from the interface, or the vicinity thereof, between the nut and the member steel sheet, and fracture occurs.

In this regard, if hydrogen trapping sites are generated beforehand in the vicinity of the surface of the member steel sheet where cracks may possibly occur, hydrogen can be stably trapped at the trapping sites, crack generation can be suppressed, and the delayed fracture resistance can be improved.

To this end, it is important to deposit Ti fine precipitates to some extent on a surface layer of a cold-rolled steel sheet before being subjected to hot pressing.

Furthermore, since cementite also functions as trapping sites, it is effective to finely disperse cementite after hot pressing. To this end, it is important to suppress segregation of C and Mn as a cold-rolled steel sheet.

The present disclosure was completed based on the above discoveries.

Specifically, primary features of the present disclosure are as follows.

1. A hot-pressed member comprising: a steel chemical composition containing (consisting of), by mass %, C: 0.28% or more and less than 0.42%, Si: 1.5% or less, Mn: 1.0% or more and 2.2% or less, P: 0.05% or less, S: 0.005% or less, Al: 0.01% or more and 0.50% or less, N: 0.005% or less, and Ti: 0.005% or more and 0.15% or less, with the balance being Fe and inevitable impurities; a microstructure in which at least 5 Ti-based precipitates having a grain size of 0.10 μm or less are present on average per 100 μm$^2$ of a cross section parallel to a thickness direction of the member within a range of 100 μm in a thickness direction from a surface of the member, a volume fraction of martensite is 95% to 100% within a depth range of 20 μm to 100 μm in the thickness direction from the surface of the member, and at least 10 cementite grains having a grain size of less than 0.20 μm are present on average in a prior austenite grain; and a tensile strength of 1780 MPa or more.

2. The hot-pressed member according to 1., wherein the steel chemical composition further contains, by mass %, at least one selected from the group consisting of Nb: 0.15% or less, B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

3. The hot-pressed member according to 1. or 2., comprising, on a surface layer thereof, an Al or Al alloy coating or plating layer or a Zn or Zn alloy coating or plating layer.

4. A cold-rolled steel sheet for hot pressing, comprising: a chemical composition containing (consisting of), by mass %, C: 0.28% or more and less than 0.42%, Si: 1.5% or less, Mn: 1.0% or more and 2.2% or less, P: 0.05% or less, S: 0.005% or less, Al: 0.01% or more and 0.50% or less, N: 0.005% or less, and Ti: 0.005% or more and 0.15% or less, with the balance being Fe and inevitable impurities; a microstructure in which at least 10 Ti-based precipitates having a grain size of 0.10 μm or less are present on average per 100 μm$^2$ of a cross section parallel to a thickness direction of the steel sheet within a range of 100 μm in the thickness direction from a surface of the steel sheet; and a standard deviation of Vickers hardness of 40 or less, the Vickers hardness being measured every 200 μm in the thickness direction within a range from a depth position of 100 μm from the surface of the steel sheet to a mid-thickness part.

5. The cold-rolled steel sheet for hot pressing according to 4., wherein the chemical composition further contains, by mass %, at least one selected from Nb: 0.15% or less, B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

6. The cold-rolled steel sheet for hot pressing according to 4. or 5., wherein the steel sheet comprises on a surface thereof an Al or Al alloy coating or plating layer or a Zn or Zn alloy coating or plating layer.

7. A method for manufacturing the cold-rolled steel sheet for hot pressing as recited in 4., the method comprising: preparing a steel raw material comprising a chemical composition containing (consisting of), by mass %, C: 0.28% or more and less than 0.42%, Si: 1.5% or less, Mn: 1.0% or more and 2.2% or less, P: 0.05% or less, S: 0.005% or less, Al: 0.01% or more and 0.50% or less, N: 0.005% or less, and Ti: 0.005% or more and 0.15% or less, with the balance being Fe and inevitable impurities; hot rolling the steel raw material to obtain a hot-rolled steel sheet under a set of conditions including a rolling reduction of 12% or more at a final pass of finish rolling, a rolling reduction of 15% or more at a pass immediately before the final pass, and a finisher delivery temperature of 860° C. to 950° C.; after the hot rolling, subjecting the hot-rolled steel sheet to primary cooling whereby the hot-rolled steel sheet is cooled to a cooling end temperature of 700° C. or lower at a first average cooling rate of 70° C./s or higher up to the cooling end temperature; after the primary cooling, subjecting the steel sheet to secondary cooling whereby the steel sheet is coiled at a coiling temperature of 520° C. or lower at a second average cooling rate of 5° C./s to 50° C./s up to the coiling temperature; then pickling the coiled hot-rolled steel sheet, and then subjecting the steel sheet to a first heat treatment whereby the steel sheet is heated in a temperature range of 830° C. to 930° C. for 600 seconds or shorter; then cold rolling the steel sheet to obtain a cold-rolled steel sheet, then subjecting the cold-rolled steel sheet to a second heat treatment whereby the cold-rolled steel sheet is heated to a temperature range of 720° C. to 850° C. at an average heating rate of 5° C./s to 20° C./s and subjected to 15 seconds to 600 seconds of soaking in the temperature range of 720° C. to 850° C.; and after the second heat treatment, subjecting the cold-rolled steel sheet to a tertiary cooling whereby the cold-rolled steel sheet is cooled to a cooling end temperature of 600° C. or lower at a third average cooling rate of 5° C./s or higher.

8. The method for manufacturing the cold-rolled steel sheet for hot pressing according to 7., wherein the chemical composition further contains, by mass %, at least one selected from the group consisting of Nb: 0.15% or less, B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

9. The method for manufacturing the cold-rolled steel sheet for hot pressing according to 7. or 8., the method further comprising: after the tertiary cooling, applying an Al or Al alloy coating or plating treatment or a Zn or Zn alloy coating or plating treatment to a surface of the cold-rolled steel sheet.

10. A method for manufacturing a hot-pressed member, comprising: heating the cold-rolled steel sheet for hot pressing as recited in any one of 4. to 6. in a temperature range of an $Ac_3$ transformation temperature to 1000° C.; and then hot pressing the steel sheet.

Advantageous Effect

According to the present disclosure, it is possible to obtain a hot-pressed member which has extremely high tensile strength after hot pressing and also has excellent delayed fracture resistance after projection welding. For example, it is possible to stably obtain a hot-pressed member which is excellent in delayed fracture resistance after projection welding with a nut, and which has a tensile strength of 1780 MPa or more and in which no cracking occurs even after immersion in hydrochloric acid under a load of 0.6×PS (PS: indentation peeling strength) applied by a bolt after being welded with an M6 nut.

Further, according to the present disclosure, it is possible to obtain a hot-pressed member with stable properties even under hot pressing conditions with large variations at the time of heating.

DETAILED DESCRIPTION

The following provides the details of the present disclosure.

First, the microstructures of the hot-pressed member and the cold-rolled steel sheet for hot pressing according to the present disclosure will be described in detail.

[Microstructure of Hot-Pressed Member]

The microstructure of the hot-pressed member is a microstructure in which at least 5 Ti-based precipitates having a grain size of 0.10 μm or less are present on average per 100 μm$^2$ of a cross section parallel to a thickness direction of the member within a range of 100 μm in a thickness direction from a surface of the member, a volume fraction of martensite is 95% to 100% within a depth range of 20 μm to 100 μm in the thickness direction from the surface of the member, and at least 10 cementite grains having a grain size of less than 0.20 μm are present on average in a prior austenite grain.

If the number of Ti-based precipitates having a grain size of 0.10 μm or less present on average per 100 μm$^2$ of a cross section parallel to the thickness direction of the member within a range of 100 μm in the thickness direction from the surface of the member is less than 5, then sufficient hydrogen trapping sites can not be obtained, the toughness deteriorates, and the delayed fracture resistance after projection welding deteriorates. The average number is preferably 10 or more. The cross section parallel to the thickness direction of the member to be measured is not particularly limited, and may be taken at any position.

Here, examples of the Ti-based precipitates include TiC, TiN, and Ti(C,N).

In addition, when the volume fraction of martensite is less than 95% within a depth range of 20 μm to 100 μm in the thickness direction from the surface of the member, it is difficult to achieve a tensile strength of 1780 MPa or more. Therefore, the volume fraction of martensite is 95% or more. It is preferably 97% or more. It may be 100%.

Furthermore, if the number of cementite grains having a grain size of less than 0.20 μm present on average in a prior austenite grain (i.e., in a single prior austenite grain) in a depth range of 20 μm to 100 μm in the thickness direction from the surface of the member is less than 10, then sufficient hydrogen trapping sites can not be obtained, and the delayed fracture resistance after projection welding deteriorates. Preferably, it is 15 or more on average.

[Microstructure of Cold-Rolled Steel Sheet for Hot Pressing]

To obtain the desired properties as a hot-pressed member, it is important to control the microstructure of the cold-rolled steel sheet for hot pressing. Specifically, the microstructure of the cold-rolled steel sheet for hot pressing is a microstructure which contains at least 10 Ti-based precipitates having a grain size of 0.10 μm or less present on average per 100 μm$^2$ of a cross section parallel to the thickness direction of the steel sheet within a range of 100 μm in the thickness direction from a surface of the steel sheet, and in which a standard deviation of Vickers hardness is 40 or less, the Vickers hardness being measured every 200 μm in the thickness direction within a range from a depth position of 100 μm from the surface of the steel sheet to a mid-thickness part.

If the number of Ti-based precipitates having a grain size of 0.10 μm or less present on average per 100 μm$^2$ of a cross section parallel to the thickness direction of the steel sheet within a range of 100 μm in the thickness direction from the surface of the steel sheet is less than 10, then it is difficult to ensure that at least 5 Ti-based precipitates having a grain size of 0.10 μm or less are present on average per 100 μm$^2$ of the cross section parallel to the thickness direction of the member within a range of 100 μm in the thickness direction from the surface of the member. As a result, the delayed fracture resistance after projection welding deteriorates. Preferably, the average number is 15 or more.

In addition, when the standard deviation of Vickers hardness measured every 200 μm in the thickness direction within a range from a depth position of 100 μm from the surface of the steel sheet to a mid-thickness part exceeds 40, the concentration distribution of C and Mn becomes remarkable (non-uniform). Accordingly, distribution of C and Mn becomes uneven at the time of reverse transformation during hot pressing, making it difficult to finely disperse cementite. As a result, the delayed fracture resistance after projection welding deteriorates. Therefore, the standard deviation of Vickers hardness measured every 200 μm in the thickness direction within a range from a depth position of 100 μm from the surface of the steel sheet to the mid-thickness part is 40 or less. Preferably, it is 35 or less. In addition, no particular limitation is placed on the cross section parallel to the thickness direction of the steel sheet to be measured, and a so-called C or L cross section may be used.

In the cold-rolled steel sheet for hot pressing, the requirement that at least 10 Ti-based precipitates having a grain size of 0.10 μm or less be present on average per 100 μm$^2$ of the cross section parallel to the thickness direction of the steel sheet within a range of 100 μm in the thickness direction from the surface of the steel sheet is mainly satisfied by the first and second heat treatments in the process of manufacturing the cold-rolled steel sheet described later. In addition, the requirement that the standard deviation of Vickers hardness measured every 200 μm in the thickness direction from a depth position of 100 μm from the surface of the steel sheet be 40 or less is mainly satisfied by the hot rolling and the first heat treatment.

Next, appropriate compositional ranges of the hot-pressed member and the cold-rolled steel sheet for hot pressing according to the present disclosure will be described. When components are expressed in "%", this refers to "mass %".

C: 0.28% or More and Less than 0.42%

C is an element effective for increasing the strength of the steel, and is an important element for strengthening martensite after hot pressing to increase the strength of the steel. However, if the C content is less than 0.28%, the hardness of martensite after hot pressing is insufficient, and a tensile strength of 1780 MPa or more can not be obtained. The C content is preferably 0.30% or more. On the other hand, when C is added by 0.42% or more, the hardness after resistance spot welding increases, the toughness decreases, and the delayed fracture resistance after projection welding decreases. Therefore, the C content is less than 0.40%. Preferably, it is less than 0.39%.

Si: 1.5% or Less

Si is an element effective for solid solution strengthening of ferrite and increasing the strength. However, excessive addition of Si lowers the toughness at the time of resistance spot welding and deteriorates the delayed fracture resistance after projection welding. Therefore, the Si content is 1.5% or less. It is preferably 1.2% or less, and more preferably 0.8% or less. Although the lower limit of the Si content is not particularly specified, it is preferable to set it at 0.005% because making the Si content extremely low leads to an increase in cost.

Mn: 1.0% or More and 2.2% or Less

Mn is an element that increases the quench hardenability during hot pressing, and thus contributes to the formation of martensite after hot pressing, that is, the increase in strength. To obtain this effect, the Mn content needs to be 1.0% or more. Preferably, it is 1.2% or more. However, when Mn is excessively added, the Mn band is excessively generated, and the cementite can not be finely dispersed after hot pressing, resulting in a lower delayed fracture resistance after projection welding. Therefore, the Mn content is 2.2% or less. Preferably, it is 2.1% or less.

P: 0.05% or Less

P contributes to the increase in strength by solid solution strengthening. However, when added excessively, segregation of P at grain boundaries becomes remarkable, the grain boundaries are embrittled, and the delayed fracture resistance after projection welding is lowered. Therefore, the P content is 0.05% or less. Preferably, it is 0.04% or less. Although the lower limit of the P content is not particularly specified, it is preferable to set it at 0.0005% because making the P content extremely low leads to an increase in steelmaking cost.

S: 0.005% or Less

When the S content is high, a large amount of sulfides such as MnS is formed, and inclusions serve as a starting point of cracking upon entry of hydrogen, causing deterioration of the delayed fracture resistance after projection welding. Therefore, an upper limit of the S content is 0.005%. Preferably, it is 0.0045% or less. Although the lower limit of the S content is not particularly specified, it is preferable to set it at 0.0002% because, as is the case with P, making the S content extremely low leads to an increase in steelmaking cost.

Al: 0.01% or More and 0.50% or Less

Al is an element necessary for deoxidation. To obtain this effect, the Al content needs to be 0.01% or more. On the other hand, adding Al beyond 0.50% does not increase this effect. Therefore, the Al content is 0.50% or less. Preferably, it is 0.40% or less.

N: 0.005% or Less

Since N forms a coarse nitride with Ti and degrades the delayed fracture resistance after projection welding, it is necessary to suppress the content. In particular, when the N content exceeds 0.005%, this tendency becomes remarkable. Therefore, the N content is 0.005% or less. It is preferably 0.004% or less, and more preferably 0.0035% or less.

Ti: 0.005% or More and 0.15% or Less

Ti is an element that contributes to the increase in strength by forming a fine carbonitride. Furthermore, Ti is extremely effective in precipitating fine Ti-based precipitates as hydrogen trapping sites on the surface layer of the member to improve the delayed fracture resistance after projection welding, and thus an important element in the present disclosure. To obtain this effect, the Ti content needs to be 0.005% or more. On the other hand, adding a large amount of Ti significantly lowers the elongation after hot pressing. Therefore, the Ti content is 0.15% or less. Preferably, it is 0.12% or less.

Moreover, in the present disclosure, the following components may be appropriately contained.

Nb: 0.15% or Less

Nb is an element that contributes to the increase in strength by forming a fine carbonitride. Furthermore, in the present disclosure, since fine Nb-based precipitates not only provide hydrogen trapping sites but also refine the austenite grain size during hot pressing, Nb is considered as an element that contributes to the improvement of the delayed fracture resistance. To obtain this effect, the Nb content is preferably 0.005% or more. More preferably, it is 0.010% or more. On the other hand, adding a large amount of Nb fails to further increase the above effect, but instead increases the cost. Therefore, the Nb content is preferably 0.15% or less. It is more preferably 0.12% or less, and even more preferably 0.10% or less.

B: 0.0050% or Less

B is an element that increases the quench hardenability during hot pressing, and thus contributes to the formation of martensite after hot pressing, that is, the increase in strength. B also improves the grain boundary strength by segregation at grain boundaries, it is effective for increasing the delayed fracture resistance. To obtain this effect, the B content is preferably 0.0002% or more. However, it is preferable that the B content be 0.0050% or less, because excessive addition of B deteriorates toughness and reduces delayed fracture resistance after projection welding. The B content is more preferably 0.0040% or less, and still more preferably 0.0035% or less.

Mo: 0.50% or Less

Mo is an element that increases the quench hardenability during hot pressing, and thus contributes to the formation of martensite after hot pressing, that is, the increase in strength. To obtain this effect, the Mo content is preferably 0.005% or more. It is more preferably 0.01% or more. On the other hand, even if a large amount of Mo is added, the above effect is saturated, leading to an increase in cost, and causing deterioration of the chemical conversion treatment property. Therefore, the Mo content is preferably 0.50% or less.

Cr: 0.50% or Less

Cr, like Mo, is an element that increases the quench hardenability during hot pressing, and thus contributes to the formation of martensite after hot pressing, that is, the increase in strength. To obtain this effect, the Cr content is preferably 0.005% or more. It is more preferably 0.01% or more. On the other hand, even if a large amount of Cr is added, the above effect is saturated, and a surface oxide is formed, deteriorating the coatability. Therefore, the Cr content is preferably 0.50% or less.

Sb: 0.001% or More and 0.020% or Less

Sb has the effect of suppressing the formation of a decarburized layer in a surface layer part of a steel sheet before heating of the steel sheet prior to hot pressing and subsequent cooling through a series of processes of hot pressing. Accordingly, the hardness distribution of the sheet surface becomes uniform, and the delayed fracture resistance after projection welding is improved. To obtain this effect, the Sb content is preferably 0.001% or more. On the other hand, if Sb is added in excess of 0.020%, the rolling load increases and the productivity decreases. Therefore, the Sb content is preferably 0.020% or less.

Ca: 0.005% or Less, Mg: 0.005% or Less, REM: 0.005% or Less

Ca, Mg, and REM control the shapes of sulfides and oxides, and suppress the formation of coarse inclusions, thereby improving the delayed fracture resistance after projection welding. To obtain this effect, it is preferable to add each element in an amount of 0.0005% or more. However, excessive addition causes an increase in inclusions and deterioration of the delayed fracture resistance after projection welding. Therefore, the content of each added element is preferably 0.005% or less. Here, REM is an element containing Sc, Y, and lanthanoid elements.

V: 0.15% or Less

V is an element that contributes to the increase in strength by forming a fine carbonitride. To obtain this effect, the V content is preferably 0.01% or more. On the other hand, since adding a large amount of V lowers the toughness at the time of resistance welding and reduces the delayed fracture resistance at a projection weld. Therefore, the V content is preferably 0.15% or less. It is more preferably 0.10% or less.

Cu: 0.50% or Less

Cu can be added as needed because not only does it contribute to the increase in strength by solid solution strengthening, but it improves the corrosion resistance and thus can improve the delayed fracture resistance after projection welding. To obtain these effects, the Cu content is preferably 0.05% or more. On the other hand, if Cu is added in excess of 0.50%, the effect is saturated and surface defects resulting from Cu tend to occur more frequently. Therefore, the Cu content is preferably 0.50% or less.

Ni: 0.50% or Less

Similarly to Cu, Ni can also be added as needed because it can improve the delayed fracture resistance after projection welding by improving the corrosion resistance. Moreover, when added simultaneously with Cu, Ni has the effect of suppressing surface defects caused by Cu. Thus, when Cu is added, addition of Ni is effective. To obtain these effects, the Ni content is 0.05% or more. However, since adding a large amount of Ni lowers the toughness at the time of resistance welding and deteriorates the delayed fracture resistance after projection welding. Therefore, the Ni content is preferably 0.50% or less.

Sn: 0.50% or Less

Similarly to Cu and Ni, Sn can also be added as needed because it can improve the delayed fracture resistance after projection welding by improving the corrosion resistance. To obtain these effects, the Sn content is 0.05% or more. However, the addition of a large amount of Sn lowers the toughness at the time of resistance welding and reduces the delayed fracture resistance after projection welding. Therefore, the Sn content is preferably 0.50% or less.

Zn: 0.10% or Less

Zn is an element that contributes to the formation of martensite after hot pressing, and thus contributes to the formation of martensite after hot pressing, that is, the increase in strength. To obtain these effects, the Zn content is preferably 0.005% or more. However, the addition of a large amount of Zn lowers the toughness at the time of resistance welding and deteriorates the delayed fracture resistance after projection welding. Therefore, the Zn content is preferably 0.10% or less.

Co: 0.10% or Less

Similarly to Cu and Ni, Co can also be added as needed because it can improve the delayed fracture resistance after projection welding as it increases the corrosion resistance by improving the hydrogen overvoltage. To obtain these effects, the Co content is preferably 0.005% or more. However, the addition of a large amount of Co lowers the toughness at the time of resistance welding and deteriorates the delayed fracture resistance after projection welding. Therefore, the Co content is preferably 0.10% or less.

Zr: 0.10% or Less

Similarly to Cu and Ni, Zr can also be added as needed because it can improve the delayed fracture resistance after projection welding by improving the corrosion resistance. To obtain these effects, the Zr content is preferably 0.005% or more. However, the addition of a large amount of Zr lowers the toughness at the time of resistance welding and deteriorates the delayed fracture resistance after projection welding. Therefore, the Zr content is preferably 0.10% or less.

Ta: 0.10% or Less

Ta, like Ti, forms alloy carbides and alloy nitrides and contributes to the increase in strength. To obtain this effect, the Ta content is preferably 0.005% or more. Excessively adding Ta, however, fails to increase the addition effect, but instead results in a rise in alloying cost. Therefore, the Ta content is preferably 0.10% or less.

W: 0.10% or Less

Similarly to Cu and Ni, W can also be added as needed since it can improve the delayed fracture resistance after projection welding by improving the corrosion resistance. To obtain these effects, the W content is preferably 0.005% or more. However, since adding a large amount of W lowers the toughness at the time of resistance welding and reduces the delayed fracture resistance after projection welding. Therefore, the W content is preferably 0.10% or less.

The balance other than the above is Fe and inevitable impurities.

Next, the cold-rolled steel sheet for hot pressing and the coating or plating layer of the hot-pressed member according to the present disclosure will be described in detail.

[Coating or Plating Layer of Cold-Rolled Steel Sheet for Hot Pressing]

The cold-rolled steel sheet for hot pressing disclosed herein may be a cold-rolled steel sheet to which a coating or plating layer is not applied, yet in order to prevent oxidation by hot pressing or to improve corrosion resistance, a coating or plating layer may be applied onto the surface of the cold-rolled steel sheet before being subjected to hot pressing.

As a coating or plating layer to be applied onto the surface of the cold-rolled steel sheet for hot pressing according to the present disclosure, an Al or Al alloy coating or plating layer or a Zn or Zn alloy coating or plating layer is suitable. Applying such coating or plating layer onto the surface of the cold-rolled steel sheet for hot pressing prevents oxidation of the surface of the steel sheet by hot pressing, and the corrosion resistance of the hot-pressed member is further improved.

Examples of the Al or Al alloy coating or plating layer include an Al—Si coating layer formed by hot dip coating. In addition, examples of the Zn or Zn alloy coating or plating layer include a hot-dip galvanizing layer formed by hot dip coating, a galvannealing layer formed by alloying it, a Zn electroplating layer formed by electroplating, and a Zn—Ni alloy electroplating layer.

However, the Al or Al alloy coating or plating layer or the Zn or Zn alloy coating or plating layer is not limited to the above-described coating or plating layers, and may be a coating or plating layer which contains at least one of Si, Mg, Ni, Fe, Co, Mn, Sn, Pb, Be, B, P, S, Ti, V, W, Mo, Sb, Cd, Nb, Cr, and Sr in addition to the main component, Al or Zn. The method for forming the Al or Al alloy coating or plating layer or the Zn or Zn alloy coating or plating layer is not limited to the disclosed method at all, and any known hot dip coating, electroplating, vapor deposition plating, or the like is applicable. The Al or Al alloy coating or plating layer or the Zn or Zn alloy coating or plating layer may be a coating or plating layer subjected to an alloying treatment after the coating or plating step.

In the present disclosure, in particular, it is more preferable that the Zn or Zn alloy coating or plating layer is a Zn—Ni alloy coating or plating layer in order to further improve the corrosion resistance of the hot-pressed member or to prevent liquid metal embrittlement cracking caused by molten Zn during hot press forming.

The coating weight of the coating or plating layer is not particularly limited, and may be set in a general manner. For example, it is preferable to have a coating or plating layer with a coating weight of 5 g/m$^2$ to 150 g/m$^2$ per surface. If the coating weight is less than 5 g/m$^2$, it may be difficult to ensure corrosion resistance, while if it exceeds 150 g/m$^2$, the resistance to coating or plating exfoliation may deteriorate.

[Coating or Plating Layer of Hot-Pressed Member]

When a cold-rolled steel sheet for hot pressing to which an Al or Al alloy coating or plating layer or a Zn or Zn alloy coating or plating layer is applied is heated and then hot-pressed, some or all of the coating or plating layer components contained in the Al or Al alloy coating or plating layer or the Zn or Zn alloy coating or plating layer diffuse into the base steel sheet to form a solid solution phase or an intermetallic compound, and at the same time, conversely, Fe which is a component of the base steel sheet diffuses into the Al or Al alloy coating or plating layer or the Zn or Zn alloy coating or plating layer to form a solid solution phase or an intermetallic compound. Further, an oxide layer containing Al is formed on the surface of the Al or Al alloy coating of plating layer, and an oxide layer containing Zn is formed on the surface of the Zn or Zn alloy coating or plating layer.

As an example, when an Al—Si coating or plating layer is heated, it changes to a coating or plating layer mainly composed of an Fe—Al intermetallic compound containing Si. Further, when a hot-dip galvanizing layer, a galvannealing layer, a Zn electroplating layer, and the like are heated, an FeZn solid solution phase in which Zn is dissolved in Fe, a ZnFe intermetallic compound, a ZnO layer in the surface layer, and the like are formed. Furthermore, when the Zn—Ni alloy electroplating layer is heated, a solid solution layer containing Ni in which a coating or plating layer component is dissolved in Fe, an intermetallic compound mainly composed of ZnNi, a ZnO layer in the surface layer, and the like are formed.

As used herein, as described above, a coating or plating layer containing Al formed by heating a cold-rolled steel sheet for hot pressing to which an Al or Al alloy coating or plating layer is applied is referred to as an Al or Al alloy coating or plating layer, and a coating or plating layer containing Zn formed by heating a cold-rolled steel sheet for hot pressing to which a Zn or Zn alloy coating or plating layer is applied is referred to as a Zn or Zn alloy coating or plating layer.

Next, a preferred method for manufacturing the cold-rolled steel sheet for hot pressing according to the present disclosure will be described. In the present disclosure, in the production of the above-described cold-rolled steel sheet, at first, a steel material (slab) having the above-described predetermined composition is hot rolled under a set of conditions including a rolling reduction of 12% or more at a final pass of finish rolling, a rolling reduction of 15% or more at a pass immediately before the final pass, and a finisher delivery temperature of 860° C. to 950° C.

After the hot rolling, the hot-rolled steel sheet is subjected to primary cooling whereby the hot-rolled steel sheet is cooled to a cooling end temperature of 700° C. or lower at a first average cooling rate of 70° C./s or higher up to the cooling end temperature.

After the primary cooling, the steel sheet is subjected to secondary cooling whereby the steel sheet is coiled at a coiling temperature of 520° C. or lower at a second average cooling rate of 5° C./s to 50° C./s up to the coiling temperature.

Then, the coiled hot-rolled steel sheet is pickled, and then subjected to a first heat treatment whereby it is heated to a temperature range of 830° C. to 930° C. for 600 seconds or shorter.

Then, the steel sheet is cold rolled to obtain a cold-rolled steel sheet, then the cold-rolled steel sheet is subjected to a second heat treatment whereby the cold-rolled steel sheet is heated to a temperature range of 720° C. to 850° C. at an average heating rate of 5° C./s to 20° C./s and subjected to 15 seconds to 600 seconds of soaking in the temperature range of 720° C. to 850° C.

After the second heat treatment, the cold-rolled steel sheet is subjected to a tertiary cooling whereby the cold-rolled steel sheet is cooled to a cooling end temperature of 600° C. or lower at a third average cooling rate of 5° C./s or higher.

Hereinafter, the above manufacturing method will be described in detail for each step.

[Heating]

For a steel slab as a raw material after being cast, it is preferable to start hot rolling either at 1150° C. to 1270° C. directly after casting without reheating or after reheating to 1150° C. to 1270° C. Under preferred conditions for hot rolling, at first, a steel slab is hot rolled at a hot rolling start temperature of 1150° C. to 1270° C.

In the present disclosure, after a steel slab is prepared, in addition to a conventional method in which a steel slab is first cooled to room temperature and then reheated, an energy saving process is also applicable without any problem, such as hot direct rolling or direct rolling, in which a steel slab is charged into a heating furnace as a warm slab without being cooled, in which a steel slab is rolled immediately after heat retention, or in which a steel slab is rolled directly after casting.

[Hot Rolling]

Rolling Reduction at a Final Pass of Finish Rolling: 12% or More

It is necessary to set the rolling reduction in the final pass of finish rolling to 12% or more from the perspectives of introducing a large number of shear bands into austenite grains, producing more nucleation sites during ferrite transformation after hot rolling to refine the crystal grains in the microstructure of the hot rolled sheet, and eliminating Mn bands. The rolling reduction at a final pass of finish rolling is preferably 13% or more. The upper limit of the rolling reduction is not particularly limited. However, when the hot rolling load is increased, the thickness variation in the width direction of the steel sheet increases, and the delayed fracture resistance may be degraded. Therefore, the upper limit is 30% or less.

Rolling Reduction at a Pass Immediately Before the Final Pass of Finish Rolling: 15% or More It is necessary to set the rolling reduction at a pass immediately before the final pass to 15% or more from the perspectives of further enhancing the strain accumulation effect such that a large number of shear bands are introduced into the austenite grains, producing even more nucleation sites during ferrite transformation to further refine the crystal grains in the microstructure of the hot rolled sheet, and further eliminating Mn bands. The rolling reduction at a pass immediately before the final pass of finish rolling is preferably 18% or more. The upper limit of the rolling reduction is not particularly limited. However, when the hot rolling load is increased, the thickness variation in the width direction of the steel sheet increases, and the delayed fracture resistance may be degraded. Therefore, the upper limit is 30% or less.

Finisher Delivery Temperature: 860° C. to 950° C.

The hot rolling needs to be finished in the austenite single phase region in order to improve the resistance to resistance welding cracking after annealing by increasing the uniformity of the microstructure of the steel sheet and reducing the anisotropy of the material property. Therefore, the finisher delivery temperature is 860° C. or higher. On the other hand, when the finisher delivery temperature exceeds 950° C., the hot-rolled microstructure becomes coarse, and the crystal grains after annealing are also coarsened. Therefore, the upper limit of the finisher delivery temperature is 950° C.

[Cooling after the Hot Rolling]

Primary Cooling: Cooling to 700° C. or Lower at a First Average Cooling Rate of 70° C./s or Higher The austenite undergoes ferrite transformation during the cooling process after the end of the hot rolling. However, since the ferrite coarsens at high temperatures, quenching is performed after the end of the hot rolling to homogenize the microstructure as much as possible, while at the same time suppressing generation of Ti-based precipitates. Accordingly, at first, as primary cooling, cooling is performed to 700° C. or lower at a first average cooling rate of 70° C./s or higher. If the first average cooling rate is lower than 70° C./s, the ferrite is coarsened, and the microstructure of the hot-rolled steel sheet becomes inhomogeneous, leading to a reduction in the delayed fracture resistance after projection welding. On the other hand, if the cooling end temperature in the primary cooling is higher than 700° C., pearlite is excessively formed in the microstructure of the hot-rolled steel sheet, and the microstructure of the steel sheet eventually becomes heterogeneous, again leading to a reduction in the delayed fracture resistance after projection welding.

Secondary Cooling: Cooling to 520° C. or Lower at a Second Average Cooling Rate of 5° C./s to 50° C./s If the average cooling rate in this secondary cooling is lower than 5° C./s, ferrite or pearlite is excessively formed in the microstructure of the hot-rolled steel sheet, and the microstructure of the steel sheet eventually becomes heterogeneous, and Ti-based precipitates coarsen, leading to a reduction in the delayed fracture resistance after projection welding. On the other hand, if the average cooling rate in the secondary cooling is higher than 50° C./s, pearlite is excessively formed in the microstructure of the hot-rolled steel sheet, and the element distribution of C becomes uneven, leading to a reduction in the delayed fracture resistance after projection welding. Furthermore, cooling to temperatures above 520° C. causes excessive formation of ferrite or pearlite in the microstructure of the hot-rolled steel sheet and coarsening of the Ti-based precipitates, again leading to a reduction in the delayed fracture resistance after projection welding.

Coiling Temperature: 520° C. or Lower

If the coiling temperature is higher than 520° C., ferrite and pearlite are excessively formed in the microstructure of the hot-rolled steel sheet, and the microstructure of the steel sheet eventually becomes heterogeneous, leading to a reduction in the delayed fracture resistance after projection welding. To avoid this, it is important to perform coiling with a bainite single phase. In addition, when coiling is performed at high temperature, Ti-based precipitates coarsen, and the delayed fracture resistance after projection welding deteriorates. Therefore, in the present disclosure, the upper limit of the coiling temperature is 520° C. It is preferably 500° C. or lower. The lower limit of the coiling temperature is not particularly specified, yet if the coiling temperature is too low, hard martensite is excessively formed to increase the cold rolling load. Therefore, the lower limit is preferably 300° C. or higher.

[Pickling]

After the hot rolling, pickling is performed to remove scale from the surface of the hot-rolled sheet. The pickling treatment is not particularly limited and may be carried out according to a conventional method.

[Heat Treatment]

First Heat Treatment: Heating to a Temperature Range of 830° C. to 930° C. for 600 Seconds or Shorter In the present disclosure, heat treatment is performed twice after hot rolling. With this setup, it is possible to eliminate Mn segregation and control the distribution state of the Ti-based precipitates to improve the delayed fracture resistance after projection welding.

If the heat treatment temperature of the first heat treatment is lower than 830° C., the element distribution becomes insufficient, and the influence of the element distribution state after hot rolling can not be removed. Accordingly, Mn segregation is not eliminated even after the subsequent second heat treatment and hot pressing, and as a result, the delayed fracture resistance after projection welding is deteriorated. On the other hand, when the first heat treatment is performed at temperatures above 930° C., coarse and hard martensite is excessively present, the microstructure after the second heat treatment becomes uneven, and Ti-based precipitates become coarse. Accordingly, the desired microstructure and distribution state of Ti-based precipitates can not be obtained after the hot pressing. Therefore, the heat treatment temperature of the first heat treatment is in a range of 830° C. to 930° C. The holding time is preferably 600 seconds or shorter from the viewpoint of suppressing the coarsening of Ti-based precipitates.

Cold Rolling

Cold rolling is performed to roll a steel sheet into a cold-rolled sheet having a predetermined thickness. The cold rolling is not particularly limited and may be carried out according to a conventional method.

Second Heat Treatment: Heating to a Temperature Range of 720° C. to 850° C. at an Average Heating Rate of 5° C./s to 20° C./s and Subjected to 15 Seconds to 600 Seconds of Soaking in the Temperature Range of 720° C. to 850° C.

The second heat treatment is carried out to promote recrystallization after cold rolling and to control the microstructure of the member after being subjected to hot pressing, the distribution state of Ti-based precipitates, and Mn segregation on the surface.

In the second heat treatment, excessively rapid heating makes it difficult for recrystallization to proceed, the upper limit of the average heating rate is set at 20° C./s. However, when the heating rate is too low, ferrite and martensite grains become coarsened, and a desired microstructure can not be obtained after hot pressing. Therefore, an average heating rate of 5° C./s or higher is required. It is preferably 8° C./s or higher. By controlling the average heating rate, it is possible to make the crystal grains finer.

Then, the steel sheet is heated to a soaking temperature range of 720° C. to 850° C. described later.

Soaking Temperature: 720° C. to 850° C.

The soaking temperature is set in a temperature range of a ferrite and austenite dual phase region. Below 720° C., the martensite fraction decreases and the Mn segregation on the surface increases. Therefore, the lower limit of the soaking temperature is set at 720° C. On the other hand, if the soaking temperature is too high, crystal grain growth of austenite becomes remarkable, the crystal grains and Ti-based precipitates become coarse, and the delayed fracture resistance after projection welding decreases. Therefore, the soaking temperature is 850° C. or lower. It is preferably 830° C. or lower.

Holding Time: 15 Seconds to 600 Seconds

In the above-described soaking temperature range, a holding time of at least 15 seconds is necessary for progress of recrystallization and austenite transformation of some or all of the microstructures. On the other hand, if the holding time is excessively long, microsegregation of Mn is promoted and bending workability is deteriorated. Therefore, the holding time is preferably 600 seconds or shorter.

[Cooling]

Cooling Conditions after Soaking: Cooling to a Temperature Range of 600° C. or Lower at a Third Average Cooling Rate of 5° C./s or Higher After the above-described soaking treatment (annealing treatment), it is necessary to perform cooling at an average cooling rate of 5° C./s or higher from the soaking temperature to a temperature range (cooling end temperature) of 600° C. or lower. If the average cooling rate is lower than 5° C./s, ferrite transformation proceeds during cooling, and the volume fraction of martensite in the cold-rolled steel sheet decreases and Ti-based precipitates become coarse, making it difficult to ensure the delayed fracture resistance after projection welding. The upper limit of the average cooling rate is not particularly specified, yet is preferably 30° C./s or lower from the viewpoint of equipment and cost. In addition, when the cooling end temperature is higher than 600° C., pearlite is excessively formed, and a predetermined volume fraction in the microstructure of the steel sheet can not be obtained, causing deterioration of the delayed fracture resistance after projection welding.

In the above-described series of manufacturing processes, particularly important in the present disclosure are the hot rolling and two heat treatments after the hot rolling (i.e., the first heat treatment as well as the second heat treatment and the subsequent cooling treatment).

That is, by appropriately controlling the above-described hot rolling and two heat treatments after the hot rolling, Mn segregation is eliminated and the distribution state of Ti-based precipitates is improved. As a result, at least 10 Ti-based precipitates having a grain size of 0.10 μm or less can be deposited on average per 100 μm$^2$ of a cross section parallel to the thickness direction of the steel sheet within a range of 100 μm in the thickness direction from the surface of the steel sheet. In addition, by appropriately controlling the hot rolling and the subsequent first heat treatment, the standard deviation of Vickers hardness measured every 200 μm in the thickness direction within a range from a depth position of 100 μm from the surface of the steel sheet to the mid-thickness part can be 40 or less.

Thereafter, the cold-rolled steel sheet may be subjected to a coating or plating treatment such as hot-dip galvanizing, or used as it is without being subjected to such treatment.

[Coating or Plating]

The cold-rolled steel sheet for hot pressing disclosed herein may be used as the cold-rolled steel sheet manufactured by the above-described manufacturing process or, depending on the purpose, may be subjected to an Al or Al alloy coating or plating treatment or a Zn or Zn alloy coating or plating treatment to form an Al or Al alloy coating or plating layer or a Zn or Zn alloy coating or plating layer.

Such coating or plating treatment is not limited at all, and any known hot-dip coating, electroplating, vapor deposition plating, and the like can be applied. In addition, after the coating or plating step, an alloying treatment may be performed. For typical coating or plating treatments, examples of the Al or Al alloy coating or plating treatment include a treatment to apply hot-dip aluminum (Al) coating and a treatment to apply hot-dip Al—Si coating, and examples of zinc or zinc alloy coating or plating treatment include a treatment to apply hot-dip galvanizing or zinc-nickel electroplating and a treatment to apply hot-dip galvanizing followed by an alloying treatment.

Temper rolling may also be carried out on the cold-rolled steel sheet. In this case, a preferred elongation ratio is 0.05% to 2.0%.

Next, hot pressing performed on the obtained cold-rolled steel sheet will be described.

The method and conditions of hot pressing are not limited in any way, and all known hot pressing methods can be applied. Although one example is given below, the present disclosure is not so limited.

For example, a cold-rolled steel sheet for hot pressing as a raw material may be heated to a temperature range of an $Ac_3$ transformation temperature to 1000° C. using an electric furnace, a gas furnace, an electric heating furnace, a far infrared heating furnace, or the like, held in this temperature range for 0 seconds to 600 seconds, transported to a press, and subjected to hot pressing in a temperature range of 550° C. to 800° C. The heating rate at the time of heating the cold-rolled steel sheet for hot pressing may be 3° C./s to 200° C./s.

Here, the $Ac_3$ transformation temperature can be determined by:

$$Ac_3 \text{ transformation temperature } (° C.)=881-206C+53Si-15Mn-20Ni-1Cr-27Cu+41Mo$$

Where each element symbol represents the content by mass % of the corresponding element. For any element not contained, it is calculated as zero.

EXAMPLES

The following describes examples according to the disclosure. The present disclosure is by no means limited by the examples described below, and can be implemented with appropriate modifications without departing from the spirit of the present disclosure. All such modifications are encompassed by the technical scope of the present disclosure.

Steels having the chemical compositions listed in Table 1 were prepared by steelmaking and cast into slabs, then heated to 1250° C., and then subjected to hot rolling under the conditions listed in Table 2 for the finisher delivery temperature (FDT). Then, each hot-rolled steel sheet is cooled to a cooling end temperature (first cooling temperature) at a first average cooling rate (Cooling Rate 1) listed in Table 2, then cooled to a coiling temperature (CT) at a second average cooling rate (Cooling Rate 2), and then wound in a coil form. Note that some samples were not subjected to a two-stage cooling step after being subjected to hot rolling, but cooled at a fixed speed, and wound in a coil form.

Then, each hot-rolled sheet thus obtained was pickled, subjected to a first heat treatment listed in Table 2, and then cold rolled with a rolling reduction listed in Table 2 to obtain a cold-rolled sheet (sheet thickness: 1.4 mm).

Then, each cold-rolled steel sheet thus obtained was subjected to a second heat treatment (also referred to as annealing treatment) under the conditions listed in Table 2 in a continuous annealing line (CAL) or a continuous galvanizing line (CGL), and cold-rolled steel sheets (CR) were obtained for those having passed through CAL and hot-dip galvanized steel sheets (GI) were obtained for those having passed through CGL. Note that some of the steel sheets having passed through CGL were subjected to a hot-dip galvanization treatment, followed by an alloying treatment at 550° C., to obtain galvannealed steel sheets (GA). In addition, a hot-dip aluminum coating treatment was performed to obtain a hot-dip aluminum coated steel sheet (AS). Furthermore, some were partially annealed in CAL, and zinc-nickel electroplated steel sheets (EZN) were obtained in an electrogalvanizing line (EGL).

Then, hot pressing was performed on the obtained cold-rolled steel sheets (including those subjected to coating or plating) under the conditions listed in Table 3.

The mold used in the hot pressing had a punch width of 70 mm, a punch shoulder radius of 4 mm, and a die shoulder radius of 4 mm, and the forming depth was 30 mm. Heating of each cold-rolled steel sheet was performed in the atmosphere using either an infrared heating furnace or an atmosphere heating furnace depending on the heating rate. In addition, cooling after pressing was performed by combining sandwiching of each steel sheet between the punch and the die with air cooling on the die released from the sandwiching, and each steel sheet was cooled from the press (start) temperature to 150° C. At this time, the cooling rate was adjusted by changing the holding time of the punch at the bottom dead center in a range of 1 second to 60 seconds.

A JIS No. 5 tensile test specimen was collected from the position of the hat bottom portion of each hot-pressed member thus obtained, and a tensile test was performed according to JIS Z 2241 to measure the tensile strength (TS).

As for the test of delayed fracture resistance after projection welding, at first, test specimens of 50 mm×150 mm were collected from various hot-pressed members. In each specimen, a hole of 10 mm in diameter was made at the center, and an M6-welding nut having four projection parts was set on an alternating current welding machine such that the center of the hole of the specimen would coincide with the center of the hole of the nut. The welding was performed by resistance welding using a single phase alternating current (50 Hz) resistance welding machine of servomotor pressure type attached to a welding gun, and test specimens having projection welds were produced. Note that the pair of electrode tips used was a flat 30 mmφ electrode pair. The welding conditions were a pressing force of 3000 N, an energization time of 7 cycles (50 Hz), a welding current of 12 kA, and a hold time of 10 cycles (50 Hz).

After fixing a bolt in the nut hole of the welded body thus obtained, the load when the nut was peeled off from the steel sheet was measured by the indentation-peel test according to JIS B 1196: 2001. The peeling strength at this time was defined as PS, and a test specimen for bolting was prepared in a way similar to the above, and the loads of 0.6×PS and 0.8×PS were applied. Subsequently, each test specimen was immersed in a solution of hydrochloric acid (pH=2.5) at room temperature to evaluate whether the nut was peeled off from the steel sheet. The delayed fracture resistance was judged as "Good" if no peeling occurred for 100 hours or more under both loads, "Fair" if peeling occurred in less than 100 hours under the load of 0.8×PS, or "Poor" if peeling occurred in less than 100 hours under both loads.

To determine the volume fraction of martensite of the member after being subjected to hot pressing, a cross section parallel to the rolling direction and the thickness direction of the steel sheet was polished, treated by corrosion with 3 vol % nital, and observed under a scanning electron microscope (SEM) at 5000 times magnification, and the area ratio was measured by a point count method (in accordance with ASTM E562-83 (1988)), and the measured area ratio was used as the volume fraction.

Further, for both cold-rolled steel sheets and pressed members, to determine the grain size of Ti-based precipitates, a cross section parallel to the thickness direction was observed at 10 locations of 0.5 μm×0.5 μm under a transmission electron microscope (TEM) at 10000 times magnification, and the equivalent circle diameter was calculated using Image-Pro available from Media Cybernetics with a lower limit of 0.005 μm to determine the grain size. To determine the number of Ti-based precipitates having a grain size of 0.10 μm or less, the cross section was observed at 10 locations of 0.5 μm×0.5 μm under a transmission electron microscope (TEM) at 10000 times magnification, and the average number density of these 10 locations was obtained. In this method, it was possible to count Ti-based precipitates having a grain size of 0.005 μm or more.

As the standard deviation of Vickers hardness of each cold-rolled steel sheet, Vickers hardness was measured in 5 lines within a range from 100 μm to 900 μm from the surface of the steel sheet for every 200 μm in the thickness direction, and the average standard deviation was determined. The test force of the measurement conditions of Vickers hardness was 300 g (2.942 N), and the holding time was 15 seconds.

The grain size and number of cementite grains in a prior austenite grain were determined as follows. Specifically, to determine the number of cementite grains having a grain size of less than 0.20 μm, a cross section parallel to the thickness direction of each member after being subjected to hot pressing was observed at 10 locations of 0.5 μm×0.5 μm under a transmission electron microscope (TEM) at 10000 and 30000 times magnification, and the average number density at 10 locations was determined. In this method, it was possible to count cementite grains having a grain size of 0.050 μm or more. Regarding the grain size, the equivalent circle diameter of cementite grains observed under the TEM was calculated, and the results were averaged.

Table 4 lists the microstructures of the cold-rolled steel sheets and the hot-pressed members thus obtained, as well as the measurement results of the tensile strength and the delayed fracture resistance after projection welding of the hot-pressed members.

TABLE 1

| Steel ID | Chemical composition (mass %) | | | | | | | | |
|---|---|---|---|---|---|---|---|---|---|
| | C | Si | Mn | P | S | Al | N | Ti | Others |
| A | 0.31 | 0.20 | 1.85 | 0.01 | 0.001 | 0.03 | 0.002 | 0.021 | — |
| B | 0.32 | 0.31 | 1.45 | 0.01 | 0.001 | 0.03 | 0.002 | 0.035 | Cr: 0.23, Nb: 0.02, B: 0.002, Sb: 0.009 |
| C | 0.34 | 1.32 | 1.57 | 0.01 | 0.001 | 0.02 | 0.003 | 0.031 | Mo: 0.24, Cu: 0.12, Sn: 0.06, Zr: 0.01 |
| D | 0.32 | 1.11 | 1.88 | 0.02 | 0.001 | 0.02 | 0.002 | 0.029 | V: 0.05, Ni: 0.19, Zn: 0.02, W: 0.02 |
| E | 0.38 | 0.22 | 1.61 | 0.01 | 0.002 | 0.03 | 0.002 | 0.019 | Co: 0.02, Ta: 0.02, Ca: 0.001 |
| F | 0.29 | 0.22 | 1.88 | 0.01 | 0.002 | 0.03 | 0.002 | 0.030 | Ca: 0.001, Mg: 0.001, REM: 0.001 |
| G | 0.24 | 0.23 | 1.59 | 0.01 | 0.001 | 0.03 | 0.003 | 0.025 | — |
| H | 0.44 | 0.15 | 2.05 | 0.01 | 0.001 | 0.03 | 0.002 | 0.034 | — |
| I | 0.32 | 0.15 | 0.45 | 0.01 | 0.001 | 0.03 | 0.002 | 0.021 | — |
| J | 0.34 | 0.22 | 3.11 | 0.01 | 0.001 | 0.02 | 0.002 | 0.015 | — |
| K | 0.31 | 0.25 | 2.15 | 0.01 | 0.001 | 0.02 | 0.003 | — | — |

TABLE 2

| Specimen No. | Steel ID | Hot rolling | | | | | | | First heat treatment | |
|---|---|---|---|---|---|---|---|---|---|---|
| | | Rolling reduction at a pass immediately before the final pass % | Rolling reduction at final pass % | FDT °C. | Cooling rate 1 °C./s | First cooling temp. °C. | Cooling rate 2 °C./s | CT °C. | Temp. °C. | Holding time s |
| 1 | A | 18 | 15 | 900 | 100 | 640 | 20 | 500 | 880 | 300 |
| 2 | B | 18 | 15 | 900 | 100 | 640 | 20 | 500 | 880 | 300 |
| 3 | C | 18 | 15 | 900 | 100 | 640 | 20 | 500 | 880 | 300 |
| 4 | D | 18 | 15 | 900 | 100 | 640 | 20 | 500 | 880 | 300 |
| 5 | E | 18 | 15 | 900 | 100 | 640 | 20 | 500 | 880 | 300 |
| 6 | A | 18 | 15 | 900 | 100 | 640 | 20 | 500 | 880 | 300 |
| 7 | C | 18 | 15 | 900 | 100 | 640 | 20 | 500 | 880 | 300 |
| 8 | D | 18 | 15 | 900 | 100 | 640 | 20 | 500 | 880 | 300 |
| 9 | E | 18 | 15 | 900 | 100 | 640 | 20 | 500 | 880 | 300 |
| 10 | F | 18 | 15 | 900 | 100 | 640 | 20 | 500 | 880 | 300 |
| 11 | A | 18 | 15 | 900 | 100 | 640 | 20 | 500 | 880 | 300 |
| 12 | B | 18 | 15 | 900 | 100 | 640 | 20 | 500 | 880 | 300 |
| 13 | C | 18 | 15 | 900 | 100 | 640 | 20 | 500 | 880 | 300 |
| 14 | E | 18 | 15 | 900 | 100 | 640 | 20 | 500 | 880 | 300 |
| 15 | F | 18 | 15 | 900 | 100 | 640 | 20 | 500 | 880 | 300 |
| 16 | A | 18 | 15 | 900 | 100 | 640 | 20 | 500 | 880 | 300 |
| 17 | B | 18 | 15 | 900 | 100 | 640 | 20 | 500 | 880 | 300 |
| 18 | C | 18 | 15 | 900 | 100 | 640 | 20 | 500 | 880 | 300 |
| 19 | D | 18 | 15 | 900 | 100 | 640 | 20 | 500 | 880 | 300 |
| 20 | F | 18 | 15 | 900 | 100 | 640 | 20 | 500 | 880 | 300 |
| 21 | A | 18 | 15 | 900 | 100 | 640 | 20 | 500 | 880 | 300 |
| 22 | B | 18 | 15 | 900 | 100 | 640 | 20 | 500 | 880 | 300 |
| 23 | C | 18 | 15 | 900 | 100 | 640 | 20 | 500 | 880 | 300 |
| 24 | D | 18 | 15 | 900 | 100 | 640 | 20 | 500 | 880 | 300 |
| 25 | E | 18 | 15 | 900 | 100 | 640 | 20 | 500 | 880 | 300 |
| 26 | A | 18 | 15 | 900 | 100 | 640 | 20 | 500 | 880 | 300 |
| 27 | A | 18 | 15 | 900 | 100 | 640 | 20 | 500 | 880 | 300 |
| 28 | A | 18 | 15 | 900 | 100 | 640 | 20 | 500 | 880 | 300 |
| 29 | A | 18 | 15 | 900 | 100 | 640 | 20 | 500 | 880 | 300 |
| 30 | A | 18 | 15 | 900 | 100 | 640 | 20 | 500 | 880 | 300 |
| 31 | A | 18 | 15 | 900 | 100 | 640 | 20 | 500 | 880 | 300 |
| 32 | A | 18 | 15 | 900 | 100 | 640 | 20 | 500 | 880 | 300 |
| 33 | A | 18 | 15 | 900 | 100 | 640 | 20 | 500 | 880 | 300 |
| 34 | A | 18 | 15 | 900 | 100 | 640 | 20 | 500 | 880 | 300 |
| 35 | A | 18 | 15 | 900 | 100 | 640 | 20 | 500 | 880 | 300 |
| 36 | A | 18 | 15 | 900 | 100 | 640 | 20 | 500 | 880 | 300 |
| 37 | A | 5 | 5 | 900 | 100 | 640 | 20 | 500 | 880 | 300 |
| 38 | A | 18 | 15 | 900 | 30 | 650 | 20 | 500 | 880 | 300 |
| 39 | A | 18 | 15 | 900 | 100 | 770 | 20 | 500 | 880 | 300 |
| 40 | A | 18 | 13 | 900 | 100 | 620 | 2 | 500 | 880 | 300 |
| 41 | A | 18 | 13 | 900 | 100 | 680 | 10 | 700 | 880 | 300 |
| 42 | A | 18 | 13 | 900 | 100 | 680 | 10 | 500 | — | — |
| 43 | A | 18 | 13 | 900 | 100 | 680 | 20 | 500 | 400 | 300 |
| 44 | A | 18 | 14 | 900 | 100 | 620 | 25 | 500 | 880 | 300 |
| 45 | B | 18 | 13 | 920 | 100 | 600 | 25 | 500 | 880 | 300 |
| 46 | B | 18 | 15 | 900 | 100 | 600 | 25 | 500 | 880 | 300 |
| 47 | B | 18 | 15 | 900 | 100 | 620 | 25 | 500 | 880 | 300 |
| 48 | B | 18 | 15 | 880 | 100 | 620 | 25 | 500 | 880 | 300 |
| 49 | B | 18 | 15 | 900 | 100 | 620 | 25 | 500 | 880 | 300 |
| 50 | G | 18 | 15 | 900 | 100 | 600 | 20 | 500 | 880 | 300 |
| 51 | H | 18 | 15 | 900 | 100 | 600 | 20 | 500 | 880 | 300 |

TABLE 2-continued

| 52 | I | 18 | 15 | 900 | 100 | 600 | 20 | 500 | 880 | 300 |
| 53 | I | 18 | 15 | 900 | 100 | 600 | 20 | 450 | 880 | 300 |
| 54 | J | 18 | 15 | 900 | 100 | 650 | 20 | 500 | 880 | 300 |
| 55 | J | 18 | 15 | 900 | 100 | 600 | 20 | 450 | 880 | 300 |
| 56 | K | 18 | 15 | 900 | 100 | 650 | 20 | 500 | 880 | 300 |
| 57 | A | 18 | 15 | 900 | Cooling rate: 30° C./s | | | 500 | 880 | 300 |
| 58 | B | 18 | 15 | 900 | Cooling rate: 30° C./s | | | 500 | 880 | 300 |

| | | Cold rolling Rolling reduction % | Second heat treatment | | | | | | |
|---|---|---|---|---|---|---|---|---|---|
| Specimen No. | Steel ID | | Average heating rate ° C./s | Soaking temp. ° C. | Holding time s | Cooling rate 3 ° C./s | Cooling end temp. ° C. | Coating or plating | Remarks |
| 1 | A | 50 | 10 | 780 | 180 | 6 | 525 | GA | Example |
| 2 | B | 50 | 10 | 780 | 180 | 6 | 525 | GA | Example |
| 3 | C | 50 | 10 | 780 | 180 | 6 | 525 | GA | Example |
| 4 | D | 50 | 10 | 780 | 180 | 6 | 525 | GA | Example |
| 5 | E | 50 | 10 | 780 | 180 | 6 | 525 | GA | Example |
| 6 | A | 50 | 10 | 780 | 180 | 6 | 525 | CR | Example |
| 7 | C | 50 | 10 | 780 | 180 | 6 | 525 | CR | Example |
| 8 | D | 50 | 10 | 780 | 180 | 6 | 525 | CR | Example |
| 9 | E | 50 | 10 | 780 | 180 | 6 | 525 | CR | Example |
| 10 | F | 50 | 10 | 780 | 180 | 6 | 525 | CR | Example |
| 11 | A | 50 | 10 | 780 | 180 | 6 | 525 | AS | Example |
| 12 | B | 50 | 10 | 780 | 180 | 6 | 525 | AS | Example |
| 13 | C | 50 | 10 | 780 | 180 | 6 | 525 | AS | Example |
| 14 | E | 50 | 10 | 780 | 180 | 6 | 525 | AS | Example |
| 15 | F | 50 | 10 | 780 | 180 | 6 | 525 | AS | Example |
| 16 | A | 50 | 10 | 780 | 180 | 6 | 525 | GI | Example |
| 17 | B | 50 | 10 | 780 | 180 | 6 | 525 | GI | Example |
| 18 | C | 50 | 10 | 780 | 180 | 6 | 525 | GI | Example |
| 19 | D | 50 | 10 | 780 | 180 | 6 | 525 | GI | Example |
| 20 | F | 50 | 10 | 780 | 180 | 6 | 525 | GI | Example |
| 21 | A | 50 | 10 | 780 | 180 | 6 | 525 | EZN | Example |
| 22 | B | 50 | 10 | 780 | 180 | 6 | 525 | EZN | Example |
| 23 | C | 50 | 10 | 780 | 180 | 6 | 525 | EZN | Example |
| 24 | D | 50 | 10 | 780 | 180 | 6 | 525 | EZN | Example |
| 25 | E | 50 | 10 | 780 | 180 | 6 | 525 | EZN | Example |
| 26 | A | 50 | 10 | 780 | 180 | 6 | 525 | GA | Example |
| 27 | A | 50 | 10 | 780 | 180 | 6 | 525 | GA | Example |
| 28 | A | 50 | 10 | 780 | 180 | 6 | 525 | GA | Example |
| 29 | A | 50 | 10 | 780 | 180 | 6 | 525 | GA | Example |
| 30 | A | 50 | 10 | 780 | 180 | 6 | 525 | GA | Example |
| 31 | A | 50 | 10 | 780 | 180 | 6 | 525 | GA | Example |
| 32 | A | 50 | 10 | 780 | 180 | 6 | 525 | GA | Example |
| 33 | A | 50 | 10 | 780 | 180 | 6 | 525 | GA | Example |
| 34 | A | 50 | 10 | 780 | 180 | 6 | 525 | GA | Example |
| 35 | A | 50 | 10 | 780 | 180 | 6 | 525 | GA | Example |
| 36 | A | 50 | 10 | 780 | 180 | 6 | 525 | GA | Example |
| 37 | A | 50 | 10 | 780 | 180 | 6 | 525 | GA | Comparative example |
| 38 | A | 50 | 10 | 780 | 300 | 6 | 525 | GA | Comparative example |
| 39 | A | 50 | 10 | 780 | 600 | 6 | 525 | GA | Comparative example |
| 40 | A | 50 | 10 | 780 | 300 | 6 | 525 | GA | Comparative example |
| 41 | A | 50 | 10 | 780 | 300 | 6 | 525 | GA | Comparative example |
| 42 | A | 50 | 10 | 780 | 180 | 6 | 525 | GA | Comparative example |
| 43 | A | 50 | 10 | 780 | 180 | 6 | 525 | GA | Comparative example |
| 44 | A | 50 | 1 | 780 | 300 | 6 | 525 | GA | Comparative example |
| 45 | B | 50 | 10 | 600 | 300 | 6 | 525 | GA | Comparative example |
| 46 | B | 50 | 10 | 950 | 300 | 6 | 525 | GA | Comparative example |
| 47 | B | 50 | 10 | 780 | 2 | 6 | 525 | GA | Comparative example |
| 48 | B | 50 | 10 | 780 | 300 | 1 | 525 | GA | Comparative example |
| 49 | B | 50 | 10 | 780 | 300 | 6 | 700 | GA | Comparative example |
| 50 | G | 50 | 10 | 780 | 300 | 6 | 525 | GA | Comparative example |
| 51 | H | 50 | 10 | 780 | 300 | 6 | 525 | GA | Comparative example |
| 52 | I | 50 | 5 | 780 | 300 | 6 | 525 | GA | Comparative example |
| 53 | I | 50 | 10 | 800 | 300 | 15 | 525 | GA | Example |
| 54 | J | 50 | 10 | 780 | 300 | 6 | 525 | GA | Comparative example |
| 55 | J | 50 | 10 | 820 | 300 | 5 | 525 | GA | Example |
| 56 | K | 50 | 10 | 780 | 300 | 6 | 525 | GA | Comparative example |
| 57 | A | 50 | 10 | 780 | 300 | 6 | 525 | GA | Comparative example |
| 58 | B | 50 | 10 | 780 | 300 | 6 | 525 | GA | Comparative example |

TABLE 3

| Specimen No. | Steel ID | Hot pressing | | | | | Remarks |
| | | Heating rate °C./s | Heating temp. °C. | Holding time s | Hot pressing temp. °C. | Cooling rate up to 150° C. °C./s | |
| --- | --- | --- | --- | --- | --- | --- | --- |
| 1 | A | 5 | 900 | 60 | 700 | 100 | Example |
| 2 | B | 5 | 900 | 60 | 700 | 100 | Example |
| 3 | C | 5 | 900 | 60 | 700 | 100 | Example |
| 4 | D | 5 | 900 | 60 | 700 | 100 | Example |
| 5 | E | 5 | 900 | 60 | 700 | 100 | Example |
| 6 | A | 5 | 900 | 60 | 700 | 100 | Example |
| 7 | C | 5 | 900 | 60 | 700 | 100 | Example |
| 8 | D | 5 | 900 | 60 | 700 | 100 | Example |
| 9 | E | 5 | 900 | 60 | 700 | 100 | Example |
| 10 | F | 5 | 900 | 60 | 700 | 100 | Example |
| 11 | A | 5 | 900 | 180 | 700 | 100 | Example |
| 12 | B | 5 | 900 | 180 | 700 | 100 | Example |
| 13 | C | 5 | 900 | 180 | 700 | 100 | Example |
| 14 | E | 5 | 900 | 180 | 700 | 100 | Example |
| 15 | F | 5 | 900 | 180 | 700 | 100 | Example |
| 16 | A | 5 | 900 | 180 | 700 | 100 | Example |
| 17 | B | 5 | 900 | 180 | 700 | 100 | Example |
| 18 | C | 5 | 900 | 180 | 700 | 100 | Example |
| 19 | D | 5 | 900 | 180 | 700 | 100 | Example |
| 20 | F | 5 | 900 | 180 | 700 | 100 | Example |
| 21 | A | 5 | 900 | 60 | 700 | 100 | Example |
| 22 | B | 5 | 900 | 60 | 700 | 100 | Example |
| 23 | C | 5 | 900 | 60 | 700 | 100 | Example |
| 24 | D | 5 | 900 | 60 | 700 | 100 | Example |
| 25 | E | 5 | 900 | 60 | 700 | 100 | Example |
| 26 | A | 3 | 900 | 60 | 700 | 100 | Example |
| 27 | A | 90 | 900 | 60 | 700 | 100 | Example |
| 28 | A | 180 | 900 | 60 | 700 | 100 | Example |
| 29 | A | 5 | 830 | 60 | 700 | 100 | Example |
| 30 | A | 5 | 950 | 60 | 700 | 100 | Example |
| 31 | A | 5 | 900 | 5 | 700 | 100 | Example |
| 32 | A | 5 | 900 | 300 | 700 | 100 | Example |
| 33 | A | 5 | 900 | 60 | 650 | 100 | Example |
| 34 | A | 5 | 900 | 60 | 750 | 100 | Example |
| 35 | A | 5 | 900 | 60 | 700 | 50 | Example |
| 36 | A | 5 | 900 | 60 | 700 | 300 | Example |
| 37 | A | 5 | 900 | 60 | 700 | 100 | Comparative example |
| 38 | A | 5 | 900 | 60 | 700 | 100 | Comparative example |
| 39 | A | 5 | 900 | 60 | 700 | 100 | Comparative example |
| 40 | A | 5 | 900 | 60 | 700 | 100 | Comparative example |
| 41 | A | 5 | 900 | 60 | 700 | 100 | Comparative example |
| 42 | A | 5 | 900 | 60 | 700 | 100 | Comparative example |
| 43 | A | 5 | 900 | 60 | 700 | 100 | Comparative example |
| 44 | A | 5 | 900 | 60 | 700 | 100 | Comparative example |
| 45 | B | 5 | 900 | 60 | 700 | 100 | Comparative example |
| 46 | B | 5 | 900 | 60 | 700 | 100 | Comparative example |
| 47 | B | 5 | 900 | 60 | 700 | 100 | Comparative example |
| 48 | B | 5 | 900 | 60 | 700 | 100 | Comparative example |
| 49 | B | 5 | 900 | 60 | 700 | 100 | Comparative example |
| 50 | G | 5 | 900 | 60 | 700 | 100 | Comparative example |
| 51 | H | 5 | 900 | 60 | 700 | 100 | Comparative example |
| 52 | I | 5 | 850 | 60 | 700 | 100 | Comparative example |
| 53 | I | 5 | 850 | 60 | 750 | 500 | Example |
| 54 | J | 5 | 850 | 60 | 700 | 100 | Comparative example |
| 55 | J | 5 | 850 | 60 | 700 | 50 | Example |
| 56 | K | 5 | 900 | 60 | 700 | 100 | Comparative example |
| 57 | A | 5 | 900 | 60 | 700 | 100 | Comparative example |
| 58 | B | 5 | 900 | 60 | 700 | 100 | Comparative example |

TABLE 4

| | Microstructure of cold-rolled steel sheet | | Microstructure of hot-pressed member | | | | | |
|---|---|---|---|---|---|---|---|---|
| | | | | | Cementite | | | |
| Specimen No. | Ti-based precipitates of 0.10 μm or less (counts/100 μm$^2$) | Vickers hardness Standard deviation | Martensite Volume fraction (%) | Ti-based precipitates of 0.10 μm or less (counts/100 μm$^2$) | grains smaller than 0.20 μm (counts/prior austenite grains) | Tensile strength TS MPa | Delayed fracture resistance | Remarks |
| 1 | 15 | 25 | 98 | 16 | 15 | 1830 | Good | Example |
| 2 | 12 | 26 | 100 | 15 | 15 | 1881 | Good | Example |
| 3 | 10 | 24 | 99 | 12 | 16 | 1821 | Good | Example |
| 4 | 14 | 25 | 97 | 15 | 17 | 1995 | Good | Example |
| 5 | 16 | 25 | 95 | 11 | 24 | 1864 | Good | Example |
| 6 | 13 | 20 | 99 | 13 | 18 | 1811 | Good | Example |
| 7 | 14 | 19 | 95 | 15 | 19 | 1812 | Good | Example |
| 8 | 12 | 25 | 98 | 14 | 20 | 1831 | Good | Example |
| 9 | 13 | 24 | 98 | 15 | 14 | 2012 | Good | Example |
| 10 | 14 | 19 | 99 | 13 | 13 | 1824 | Good | Example |
| 11 | 12 | 20 | 98 | 15 | 15 | 1822 | Good | Example |
| 12 | 11 | 24 | 97 | 15 | 13 | 1805 | Good | Example |
| 13 | 13 | 25 | 95 | 13 | 14 | 1798 | Good | Example |
| 14 | 14 | 25 | 99 | 14 | 12 | 1921 | Good | Example |
| 15 | 15 | 24 | 97 | 15 | 13 | 1825 | Good | Example |
| 16 | 13 | 25 | 99 | 15 | 15 | 1834 | Good | Example |
| 17 | 12 | 24 | 98 | 13 | 16 | 1877 | Good | Example |
| 18 | 12 | 23 | 99 | 14 | 13 | 1824 | Good | Example |
| 19 | 11 | 20 | 98 | 15 | 12 | 2011 | Good | Example |
| 20 | 13 | 21 | 97 | 16 | 15 | 1834 | Good | Example |
| 21 | 14 | 20 | 95 | 14 | 12 | 1835 | Good | Example |
| 22 | 13 | 19 | 99 | 12 | 19 | 1824 | Good | Example |
| 23 | 13 | 25 | 97 | 15 | 20 | 1833 | Good | Example |
| 24 | 14 | 24 | 99 | 11 | 14 | 2004 | Good | Example |
| 25 | 12 | 19 | 95 | 13 | 13 | 1834 | Good | Example |
| 26 | 13 | 20 | 98 | 15 | 15 | 1805 | Good | Example |
| 27 | 14 | 24 | 98 | 14 | 13 | 1901 | Good | Example |
| 28 | 12 | 25 | 99 | 15 | 14 | 1833 | Good | Example |
| 29 | 11 | 24 | 98 | 13 | 12 | 1834 | Good | Example |
| 30 | 13 | 23 | 97 | 15 | 13 | 1824 | Good | Example |
| 31 | 15 | 20 | 95 | 15 | 15 | 1841 | Good | Example |
| 32 | 16 | 21 | 99 | 13 | 16 | 1830 | Good | Example |
| 33 | 13 | 20 | 98 | 15 | 13 | 1809 | Good | Example |
| 34 | 12 | 20 | 99 | 15 | 12 | 1821 | Good | Example |
| 35 | 15 | 21 | 98 | 13 | 15 | 1801 | Good | Example |
| 36 | 13 | 20 | 97 | 14 | 13 | 1889 | Good | Example |
| 37 | <u>5</u> | <u>41</u> | 94 | <u>4</u> | <u>5</u> | 1833 | Poor | Comparative example |
| 38 | <u>8</u> | <u>51</u> | 95 | <u>3</u> | <u>8</u> | 1855 | Poor | Comparative example |
| 39 | <u>8</u> | <u>49</u> | 99 | <u>4</u> | <u>8</u> | 1844 | Poor | Comparative example |
| 40 | 24 | <u>45</u> | 97 | <u>4</u> | 24 | 1833 | Poor | Comparative example |
| 41 | <u>5</u> | <u>45</u> | 96 | <u>1</u> | <u>5</u> | 1846 | Poor | Comparative example |
| 42 | <u>6</u> | <u>41</u> | 98 | <u>4</u> | <u>6</u> | 1811 | Poor | Comparative example |
| 43 | <u>7</u> | 29 | 98 | <u>4</u> | <u>7</u> | 1842 | Poor | Comparative example |
| 44 | <u>8</u> | <u>41</u> | 98 | <u>4</u> | <u>8</u> | 1841 | Poor | Comparative example |
| 45 | <u>8</u> | <u>61</u> | 94 | 11 | <u>8</u> | 1849 | Poor | Comparative example |
| 46 | <u>9</u> | <u>45</u> | 96 | <u>4</u> | <u>9</u> | 1914 | Poor | Comparative example |
| 47 | <u>7</u> | <u>51</u> | 98 | <u>3</u> | <u>7</u> | 1844 | Poor | Comparative example |
| 48 | <u>6</u> | <u>41</u> | 97 | <u>4</u> | <u>6</u> | 1894 | Poor | Comparative example |
| 49 | <u>5</u> | <u>42</u> | 98 | <u>3</u> | <u>5</u> | 1944 | Poor | Comparative example |
| 50 | 15 | 34 | 98 | 7 | 15 | <u>1588</u> | Poor | Comparative example |
| 51 | <u>5</u> | <u>43</u> | 99 | 8 | <u>5</u> | 2433 | Poor | Comparative example |
| 52 | 11 | 28 | <u>84</u> | 9 | 11 | <u>1541</u> | Poor | Comparative example |
| 53 | 11 | 38 | 99 | 5 | 11 | 1795 | Fair | Example |
| 54 | <u>5</u> | <u>60</u> | 98 | 10 | <u>5</u> | 1884 | Poor | Comparative example |
| 55 | 11 | 37 | 99 | 5 | 11 | 1889 | Fair | Example |
| 56 | <u>5</u> | <u>43</u> | 98 | <u>4</u> | <u>5</u> | 1810 | Poor | Comparative example |
| 57 | <u>6</u> | <u>48</u> | 99 | <u>4</u> | 8 | 1833 | Poor | Comparative example |
| 58 | <u>7</u> | <u>51</u> | 99 | <u>4</u> | <u>9</u> | 1811 | Poor | Comparative example |

Underlined if outside the scope of the disclosure.

As can be seen from Table 4, all of our examples in which the chemical compositions and the microstructures of hot-pressed members satisfy the appropriate ranges of the present disclosure have excellent delayed fracture resistance after projection welding, not to mention high tensile strength.

The invention claimed is:

1. A cold-rolled steel sheet for hot pressing, comprising:
   a chemical composition containing, by mass %, C: 0.28% or more and less than 0.42%, Si: 1.5% or less, Mn: 1.0% or more and 2.2% or less, P: 0.05% or less, S: 0.005% or less, Al: 0.01% or more and 0.50% or less, N: 0.005% or less, and Ti: 0.005% or more and 0.15% or less, with the balance being Fe and inevitable impurities,
   a microstructure in which at least 10 Ti-based precipitates having a grain size of 0.005 µm or more and 0.10 µm or less are present on average per 100 µm² of a cross section parallel to a thickness direction of the steel sheet within a range of 100 µm in the thickness direction from a surface of the steel sheet; and
   a standard deviation of Vickers hardness of 40 or less, the Vickers hardness being measured every 200 µm in the thickness direction within a range from a depth position of 100 µm from the surface of the steel sheet to a mid-thickness part.

2. The cold-rolled steel sheet for hot pressing according to claim 1, wherein the chemical composition further contains, by mass %, at least one selected from Nb: 0.15% or less, B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

3. The cold-rolled steel sheet for hot pressing according to claim 1, wherein the steel sheet comprises on a surface thereof an Al or Al alloy coating or plating layer or a Zn or Zn alloy coating or plating layer.

4. The cold-rolled steel sheet for hot pressing according to claim 2, wherein the steel sheet comprises on a surface thereof an Al or Al alloy coating or plating layer or a Zn or Zn alloy coating or plating layer.

5. A hot-pressed member comprising:
   a steel chemical composition containing, by mass %, C: 0.28% or more and less than 0.42%, Si: 1.5% or less, Mn: 1.0% or more and 2.2% or less, P: 0.05% or less, S: 0.005% or less, Al: 0.01% or more and 0.50% or less, N: 0.005% or less, and Ti: 0.005% or more and 0.15% or less, with the balance being Fe and inevitable impurities;
   a microstructure in which
      at least 5 Ti-based precipitates having a grain size of 0.005 µm or more and 0.10 µm or less are present on average per 100 µm² of a cross section parallel to a thickness direction of the member within a range of 100 µm in a thickness direction from a surface of the member, a volume fraction of martensite is 95% to 100% within a depth range of 20 µm to 100 µm in the thickness direction from the surface of the member, and at least 10 cementite grains having a grain size of less than 0.20 µm are present on average in a prior austenite grain; and
   a tensile strength of 1780 MPa or more.

6. The hot-pressed member according to claim 5, wherein the steel chemical composition further contains, by mass %, at least one selected from the group consisting of Nb: 0.15% or less, B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

7. The hot-pressed member according to claim 5, comprising, on a surface layer thereof, an Al or Al alloy coating or plating layer or a Zn or Zn alloy coating or plating layer.

8. The hot-pressed member according to claim 6 comprising, on a surface layer thereof, an Al or Al alloy coating or plating layer or a Zn or Zn alloy coating or plating layer.

9. A method for manufacturing the cold-rolled steel sheet for hot pressing as recited in claim 1, the method comprising:
   preparing a steel raw material comprising a chemical composition containing, by mass %, C: 0.28% or more and less than 0.42%, Si: 1.5% or less, Mn: 1.0% or more and 2.2% or less, P: 0.05% or less, S: 0.005% or less, Al: 0.01% or more and 0.50% or less, N: 0.005% or less, and Ti: 0.005% or more and 0.15% or less, with the balance being Fe and inevitable impurities;
   hot rolling the steel raw material to obtain a hot-rolled steel sheet under a set of conditions including a rolling reduction of 12% or more at a final pass of finish rolling, a rolling reduction of 15% or more at a pass immediately before the final pass, and a finisher delivery temperature of 860° C. to 950° C.;
   after the hot rolling, subjecting the hot-rolled steel sheet to primary cooling whereby the hot-rolled steel sheet is cooled to a cooling end temperature of 700° C. or lower at a first average cooling rate of 70° C./s or higher up to the cooling end temperature;
   after the primary cooling, subjecting the steel sheet to secondary cooling whereby the steel sheet is coiled at a coiling temperature of 520° C. or lower at a second average cooling rate of 5° C./s to 50° C./s up to the coiling temperature;
   then pickling the coiled hot-rolled steel sheet, and then subjecting the steel sheet to a first heat treatment whereby the steel sheet is heated in a temperature range of 830° C. to 930° C. for 600 seconds or shorter;
   then cold rolling the steel sheet to obtain a cold-rolled steel sheet, then subjecting the cold-rolled steel sheet to a second heat treatment whereby the cold-rolled steel sheet is heated to a temperature range of 720° C. to 850° C. at an average heating rate of 5° C./s to 20° C./s and subjected to 15 seconds to 600 seconds of soaking in the temperature range of 720° C. to 850° C.; and
   after the second heat treatment, subjecting the cold-rolled steel sheet to a tertiary cooling whereby the cold-rolled steel sheet is cooled to a cooling end temperature of 600° C. or lower at a third average cooling rate of 5° C./s or higher.

10. The method for manufacturing the cold-rolled steel sheet for hot pressing according to claim 9, wherein
   the chemical composition further contains, by mass %, at least one selected from the group consisting of Nb: 0.15% or less, B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

11. The method for manufacturing the cold-rolled steel sheet for hot pressing according to claim 9, the method further comprising:
  after the tertiary cooling, applying an Al or Al alloy coating or plating treatment or a Zn or Zn alloy coating or plating treatment to a surface of the cold-rolled steel sheet.

12. A method for manufacturing a hot-pressed member, comprising:
  heating the cold-rolled steel sheet for hot pressing as recited in claim 1 in a temperature range of an $Ac_3$ transformation temperature to 1000° C.; and
  then hot pressing the steel sheet.

13. The method for manufacturing the cold-rolled steel sheet for hot pressing according to claim 10, the method further comprising:
  after the tertiary cooling, applying an Al or Al alloy coating or plating treatment or a Zn or Zn alloy coating or plating treatment to a surface of the cold-rolled steel sheet.

14. A method for manufacturing a hot-pressed member, comprising:
  heating the cold-rolled steel sheet for hot pressing as recited in claim 2 in a temperature range of an $Ac_3$ transformation temperature to 1000° C.; and
  then hot pressing the steel sheet.

15. A method for manufacturing a hot-pressed member, comprising:
  heating the cold-rolled steel sheet for hot pressing as recited in claim 3 in a temperature range of an $Ac_3$ transformation temperature to 1000° C.; and
  then hot pressing the steel sheet.

16. A method for manufacturing a hot-pressed member, comprising:
  heating the cold-rolled steel sheet for hot pressing as recited in claim 4 in a temperature range of an $Ac_3$ transformation temperature to 1000° C.; and
  then hot pressing the steel sheet.

* * * * *